US008150747B2

(12) United States Patent
Neher, III et al.

(10) Patent No.: US 8,150,747 B2
(45) Date of Patent: Apr. 3, 2012

(54) DISPOSABLE TAX RETURN PREPARATION DEVICE

(75) Inventors: Ted Richard Neher, III, Poway, CA (US); Daniel R. Brownstone, San Francisco, CA (US); Robert R. Sachs, Walnut Creek, CA (US)

(73) Assignee: Intuit Inc., Mountain View, CA (US)

( * ) Notice: Subject to any disclaimer, the term of this patent is extended or adjusted under 35 U.S.C. 154(b) by 1574 days.

(21) Appl. No.: 11/285,917

(22) Filed: Nov. 23, 2005

(65) Prior Publication Data

US 2007/0136157 A1  Jun. 14, 2007

(51) Int. Cl.
G06F 17/22 (2006.01)
G06F 17/60 (2006.01)
(52) U.S. Cl. ......................................................... 705/31
(58) Field of Classification Search ...................... 705/31
See application file for complete search history.

(56) References Cited

U.S. PATENT DOCUMENTS

| 5,193,057 | A  | * | 3/1993 | Longfield ............ | 705/31 |
|-----------|----|---|--------|----------------------|--------|
| 6,202,052 | B1 | * | 3/2001 | Miller ................ | 705/31 |
| 7,379,907 | B2 | * | 5/2008 | Dang et al. .......... | 705/31 |
| 2001/0037268 | A1 | * | 11/2001 | Miller ............... | 705/31 |
| 2007/0136160 | A1 | * | 6/2007 | Wilson et al. ........ | 705/31 |

OTHER PUBLICATIONS

The Magic Bullet Personal Blender Earns Infomercial of the Year Honor, PR Newswire, p NA, Oct. 6, 2005.*

* cited by examiner

*Primary Examiner* — Garcia Ade
(74) *Attorney, Agent, or Firm* — Osha • Liang LLP (57) ABSTRACT

A tax return preparation kit is provided that contains a disposable tax return preparation device for receiving taxpayer input of tax related data for use in preparing an electronic tax return. The disposable tax return preparation device is adapted to prepare an electronic tax return based on the tax related data. A communications cable is also provided for communicatively coupling the disposable tax return preparation device to a telecommunications system, for transmitting the electronic tax return to a remote tax return preparation system also coupled to the telecommunications system. The remote tax return preparation system is adapted to receive the tax return prepared by the disposable tax return preparation device, confirm the tax return, and electronically file the tax return with a tax authority.

46 Claims, 7 Drawing Sheets

DISPOSABLE TAX RETURN PREPARATION DEVICE

BACKGROUND

The present invention relates generally to the field of computer-based tax return preparation using a disposable tax return preparation device.

Tax return preparation software is currently used by a large percentage of tax payers to prepare tax returns for themselves or for others. An obvious prerequisite for the use of tax return preparation software is a personal computer. Even today, there remain a sizeable number of taxpayers who do not own personal computers, and therefore cannot benefit from tax return preparation software. For these people, when it comes time to prepare their tax return, their choices are typically limited to either preparing the return themselves by hand, or else paying a tax consultant a costly fee to prepare the return on their behalves.

SUMMARY

The present invention provides a low cost, dedicated, portable, electronic, disposable, self-powered, tax return preparation device that can be easily used by a taxpayer to prepare and file a tax return, and which thereafter may be discarded or recycled.

In an embodiment of the present invention, a dedicated, portable, and disposable tax return preparation device (TPD) includes a read only memory storing a tax return preparation application, a restricted operating system adapted to support execution of a tax return preparation application, a number of functions keys and alphanumeric keys for receiving user inputs of tax related data to the tax return preparation application, a processor that executes the tax return preparation application to process the tax related data and calculate tax return data as needed, a random-access memory for storing the input or calculated tax return data, a self-power source (e.g., a battery or solar cell) for powering the device, and a communications protocol stack for coupling the device to a communications network and transmitting the tax return data to a remote tax return preparation and filing system provided by a tax return preparation service provider. The tax return preparation and filing system prepares an electronic tax return on behalf of a user (the tax payer), and transmits (files) the prepared electronic tax return with a taxing authority. The user can then discard the tax return preparation device.

In another, the TPD includes a read only memory storing a tax return preparation application, a restricted operating system adapted to support execution of a tax return preparation application, a number of functions keys and alphanumeric keys for receiving user inputs of tax related data to the tax return preparation application, a processor that executes the tax return preparation application to process the tax related data and calculate tax return data as needed, a random-access memory for storing the input or calculated tax return data, a self-power source (e.g., a battery or solar cell) for powering the device. The TPD executes the tax return preparation application and receives and stores the tax return data. The user than mails the TPD to a service provider who operates a tax return preparation and filing system. The TPD is received by the service provider, and the tax return data is downloaded from the TPD into the tax return preparation and filing system. The tax return preparation and filing system prepares an electronic tax return on behalf of the tax payer, and transmits (files) the prepared electronic tax return with a taxing authority. The service provider can then discard, recycle, or reuse the tax return preparation device with another tax payer.

Another aspect of the invention comprises a tax return preparation and filing system. This system includes a tax return intake server that communicates with the dedicated tax return preparation devices to receive taxpayers' tax return data from the TPDs. A tax return preparation application verifies the tax return data and prepares electronic tax returns from the tax return data. A tax return database communicates with the intake server and the tax return preparation application to receive and store the tax return data and electronic tax returns. An account management server communicates with the tax return database to manage taxpayer accounts, including providing a taxpayers with access to the electronic tax returns, determine return status, and create printed copies of returns. An authentication server communicates with a TPD to authenticate the TPD prior to preparing the taxpayer's electronic tax return. A financial institution front-end server provides an interface to allow the service provider to receive communication from a taxpayer's financial institution when a tax refund is to be deposited into the taxpayer's financial account.

Another aspect of the present invention is the methodology by which the tax return preparation service provider enables the user of the tax return preparation devices to prepare and file electronic tax returns. In one embodiment, the service provider distributes the TPDs at various retail outlets or distribution centers. The TPDs may be sold individually, bundled with other goods or services (e.g., in conjunction with opening a financial account), or given away free. In one embodiment the TPD is provided in a kit that includes a communications cable for coupling the TPD to a communications network. A taxpayer takes the TPD home and initiates use of the device, whereby the tax return preparation application is executed and the user inputs their tax related data into the TPD during a tax return preparation session. During the tax return preparation session, the TPD guides the taxpayer through an interview using a sequence of screen prompts that appear on the TPD's display, and which prompt the taxpayer to input certain personal, financial, and tax information about the taxpayer. The taxpayer inputs tax related data in response to these prompts via the function and alphanumeric keys. In some embodiment, the taxpayer is able to by-pass any prompts from the TPD and enter either personal information or tax information directly through the use of either preconfigured hard keys, or software configured soft keys. For example, preconfigured hard keys would include keys to initiate data entry of a tax related data such as the taxpayer's income (e.g., wages, interest), deductions (e.g., number of children), taxes paid or withheld, exemptions or the like. Soft keys are keys whose functionality is reassigned by tax return preparation depending on the state of the received data or the mode of the device. Soft keys thereby allow for a smaller number of overall keys on the TDB while providing greater flexibility in managing user input. The TPD uses the input data to calculate the taxpayer's tax liability, including whether a tax payment is due or a refund is to be received by the taxpayer.

Where the TPD is provided with the communications cable, once the taxpayer's tax related data has been entered and stored in the TPD, the TPD prompts the taxpayer whether to electronically file the tax return, and instructs the taxpayer to connect the TPD to the communications network. The taxpayer connects the TPD to a communications network, using for example, the provided communications cable. The TPD may have a dedicated, preconfigured hard key for initiating the connection and electronic filing operations. The TPD is preprogrammed to communicate over the network with the service provider's tax return preparation and filing system, thereby eliminating the need for the taxpayer to provide a network address, phone number or other communications configuration data. Once the TPD connects with the tax return preparation and filing system, the system authenticates the TPD via the authentication server. The account management server facilitates the taxpayer in establishing an account by which the taxpayer can have their electronic tax return prepared and filed with the taxing authority. The TPD transmits the taxpayer's tax return data to the tax return preparation and filing system. In one embodiment the tax return data is transmitted in encrypted form. The tax return preparation application receives the tax return data, and verifies the tax liability and payment/refund amounts. The verified tax return data is communicated back to the TPD via the communications network. The taxpayer reviews the tax return data on the TPD and then indicates an approval to file the electronic tax return based upon the tax return data. The tax return preparation and filing system acknowledges the taxpayer's approval. The taxpayer can then disconnect the TPD, and discard it. The tax return preparation and filing system prepares an electronic return for the taxpayer, and files it with the taxing authority. The tax return preparation and filing system outputs a printed copy of the filed tax return; the service provider then mails that printed copy back to the taxpayer for his records. The taxpayer can discard the TPD, or return it to the service provider for reuse or recycling.

Where the TPD is provided without a communication cable and communications interface, the taxpayer mails (or otherwise physically delivers) the TPD to the service provider. The service provider downloads the tax return data from the TPD and processes via the tax return preparation and filing system. The tax return preparation and filing system prepares an electronic return for the taxpayer, and files it with the taxing authority. The tax return preparation and filing system outputs a printed copy of the filed tax return; the service provider then mails that printed copy back to the taxpayer for his records. The service provider can then discard, recycle or reuse the TPD, for example by placing the TPD back into retail distribution.

The features and advantages described in this summary and the following detailed description are not all-inclusive. Many additional features and advantages will be apparent to one of ordinary skill in the art in view of the drawings, specification, and claims hereof. Moreover, it should be noted that the language used in this disclosure has been principally selected for readability and instructional purposes, and may not have been selected to delineate or circumscribe the inventive subject matter, resort to the claims being necessary to determine such inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Figure 1:
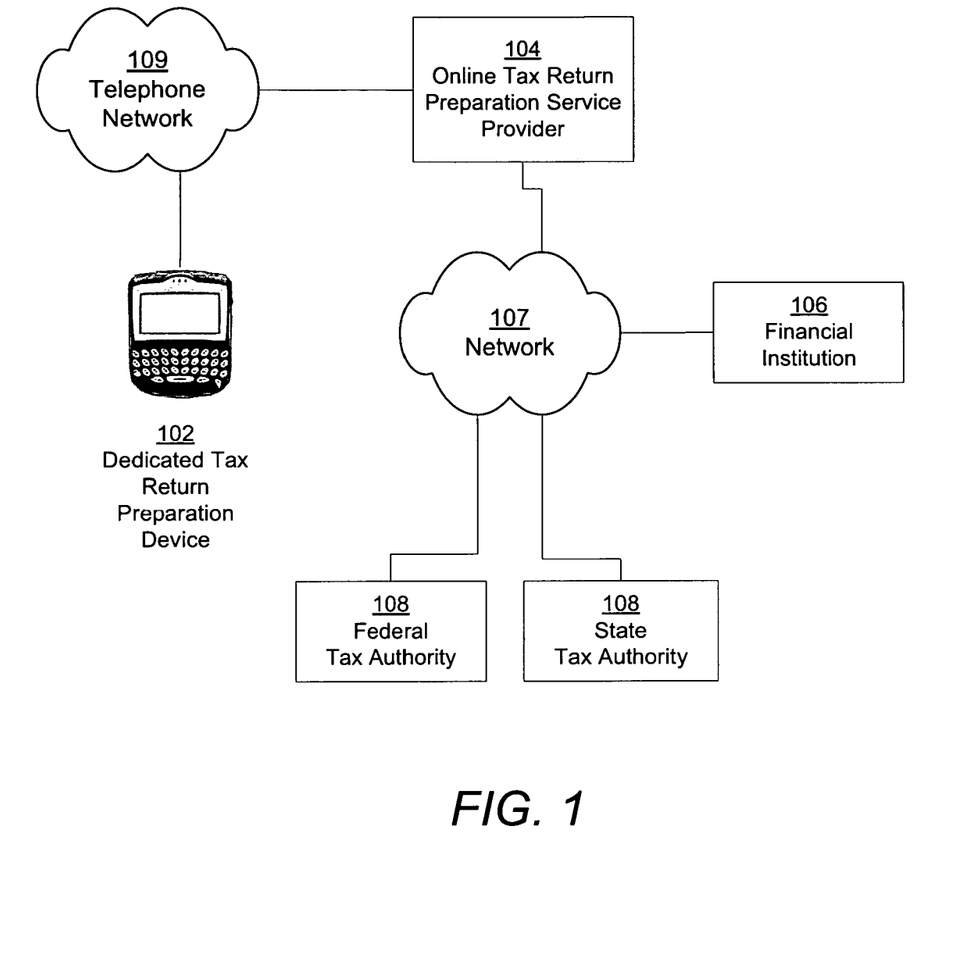
FIG. 1 is a block diagram of a system for providing tax services with a portable, dedicated, disposable tax return preparation device in accordance with an embodiment of the present invention.

FIG. 1 is a system diagram showing the overall system design for an online tax return preparation service 104 that provides electronic tax filing services to taxpayers using portable, dedicated, disposable dedicated tax return preparation devices 102. In the system design, there are a large number (though only one is shown) of dedicated tax return preparation devices (TPD) 102 distributed to taxpayers. In one embodiment, the TPDs 102 are adapted to communicate via a telephone network 109 with the service provider (SP) 104. The service provider 104 communicates over a network 107 (e.g., Internet, private network) with various financial institutions 106 and various tax authorities 108 including federal and state tax authorities. Generally speaking, a taxpayer enters tax related data into the TPD 102, which calculates the tax return data (e.g., tax liability, refund or payment due). The taxpayer then couples the TPD 102 to the telephone network 109 (e.g., using a standard RJ-45 cable). The TPD 102 is preprogrammed to communicate with the online service provider 104 to upload the tax return data to the service provider 104. The service provider 104 establishes an account for the taxpayer, verifies the tax return data and generates and transmits electronic tax returns to one or more of the tax authorities 108 via network 107. In establishing an account for the taxpayer, the service provider 104 may instruct the financial institution to open an account on behalf of the taxpayer for receiving a tax refund for the taxpayer from one or more of the tax authorities 108. In another embodiment, the TPDs 102 does not have a communications interface, and are not adapted to thereby communicate electronically with the service provider 109.

The financial institutions 106 can be any type of institution that is authorized to accept deposits of tax refunds from tax authorities 108. The financial institution may be a bank, a savings and loan, a credit union, a trust company, or any entity holding funds for a tax payer. A tax authority 108 is any government institution (federal, state, or local) responsible for administering and enforcing revenue laws, through the assessment and collection of taxes, determination of pension plan qualification, and related activities. In an embodiment, a tax authority 108 can receive and credit funds directly from the financial institution 106 by way of the telecommunications network.

Figure 2:
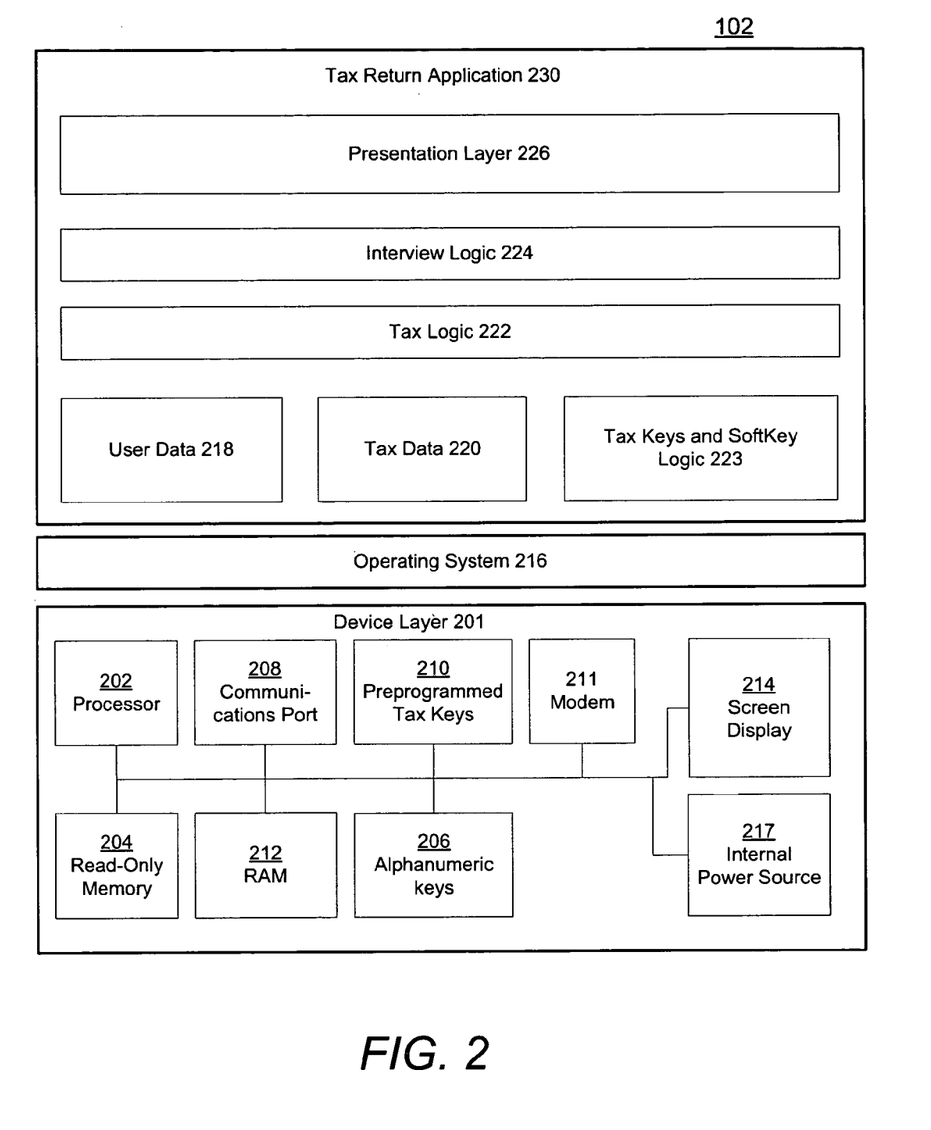
FIG. 2 is a block diagram of a portable, dedicated, disposable tax return preparation device in accordance with an embodiment of the present invention.

FIG. 2 is a block diagram of general hardware and software architecture for a portable, dedicated, disposable tax return preparation device 102 in accordance with one embodiment of the present invention. The dedicated tax return preparation device 102 includes a device layer 201, a restricted operating system 216, and tax return preparation application 230. Generally, the TPD 102 is adapted to execute the tax return preparation application 230, and receive user input of tax related data regarding personal, financial, and tax information. Based upon the user's input, the TPD 102 calculates a user's tax return data. The TPD 102 is further adapted to electronically communicate the tax return data to the service provider 104 for preparation and filing of an electronic tax return filing with the tax authority 108.

The device layer 201 includes a screen display 214, a processor 202, an internal power source 218, a communications port 208, a modem 211, preprogrammed tax function keys 210, alphanumeric keys 206, a read-only memory 204, and a random access memory 212. The elements are communicatively coupled to each other by way of a conventional switching membrane or bus.

The software layer of the TPD 102 includes an operating system (OS) 216 and the tax return preparation application 230, both of which are stored (either in whole or in part) in read-only memory 204. The OS 216 is an example of an operating system means. In one embodiment the functionality of the OS 216 is restricted to supporting the execution of the tax return preparation application 230, storing the data associated therewith, and communicating with the service provider system 104. In this embodiment, the OS 216 does not provide general application support, such as the ability for the device to execute applications other than the tax return preparation application 230 (or its associated modules) and the communication functionality. For example, the OS 216 does not, in this embodiment, provide support (or application execution) for music or video playback, email, word processing, spreadsheets, databases, graphics or other business productivity applications typically executed on personal computers. The restriction on the capabilities of the OS 216 increases the reliability of the OS, reduces the complexity of the OS as well as the cost of the TPD 102, thereby further supporting the disposability of the device. In one low cost embodiment, the OS 216 need not support broadband internet access, as communication with the service provider 104 is made via modem 211 to a telephone network 109 via a protocol such as Telnet or FTP. In other embodiments the OS 216 is not so restricted. The OS 216 can be adapted from various embedded operating systems including, but not limited to, BlueCat Linux 5.0, Wind River Workbench 2.2, a Windows based operating system, PalmOne OS, or other operating system designed to run on a portable device.

Random access memory 212 is an example of a memory means, and is adapted to store tax-related data provided by the user, in response screen prompts provided by the tax return preparation application 203, as well as computed results from the tax return preparation application 230, and interim data. In one embodiment, RAM 212 is conventional flash memory, which enables the device to be updated after it is obtained with the most recent program versions, drivers, and the like.

The processor 202 is an example of a processing means that executes the OS (and its related programs, such as a communications protocol stack) as well as the tax return preparation application 230 stored in ROM 204 to operate device 102. The processor 202 can be any of a number of conventional processors commercially available today.

Communications port 208 is an example of a communication means that enables TPD 102 to send and receive data to and from the service provider 104. In one embodiment, communications port 208 is used to upload tax return data to the service provider 104. It may additionally be used to receive updated tax return application code and data from the service provider 104. In one embodiment, communications port 208 is a conventional telephone RJ-11 jack, and is coupled to modem 211.

Alphanumeric keys 206 provide the user with an input means for inputting personal, financial, and tax data in response to particular queries from TPD 102. The keys 206 are switches on a membrane, though other types of interfaces (e.g., capacitive) may be used. Screen display 214 provides the user interface for the TPD 102, and generally displays prompts, form fields and graphics. The user responds by entering the information using alphanumeric keys 206.

Preprogrammed tax key 210, on the other hand, are an exemplary means for providing the user with various preprogrammed function keys that cause the tax return preparation application 230 to perform specific tax return related tasks. In one embodiment, the tax keys 210 include a "File it!" key for initiating the communication of the tax return data to the service provider 104, and a "Help" key, that causes the display of context sensitive help information; the help information is context sensitive in that it is selected based on the current state of tax return preparation application (e.g., current screen being displayed, tax related data received, and so forth). Other tax keys 210 are discussed further below. In one embodiment the preprogrammed tax keys 210 are hard keys (i.e., physical key devices). In an alterative embodiment, the tax keys 210 are soft keys which appear in association with selected areas of the screen display 214 (and optionally, assigned to selected hard keys). The assignment and logic of the tax keys (whether as hard keys or softkeys) is stored in tax key and softkey logic 223; this logic and data defines which tax key 210 is associated with which functions of the tax return preparation application 203, and where appropriate its associated softkey representation (e.g., location, graphical appearance).

The tax return preparation application 230 includes: a presentation layer 226, interview logic 224, tax logic 222, the aforementioned tax keys and softkeys logic 223, as well as tax data 220 and user data 218. The presentation layer 226 is an example of one means for providing an overall user interface for TPD 102. The presentation layer 226 controls various tasks within TPD 102. The presentation layer 226 is responsible for formatting and displaying text and graphics (including graphical user interface controls, such as menus and buttons) on the display 214, receiving user inputs via the tax keys 210 and alphanumeric keys 206, and storing user inputs in appropriate data structure in user data 218 and tax data 220 within RAM 212. One of ordinary skill in the art will appreciate a variety of tasks and functions that can be controlled by the presentation layer 226 while managing the user interface between the user and the TPD 102. As indicated above, the tax return preparation application 230 can be stored in whole or in part in read only memory 204, or in whole or in part in random access memory 212.

The interview logic 224 is an example of one means for determining which screen prompts to show in response to the user inputs of tax related data comprising personal, financial, and tax information. The determination includes determining which screen prompts to show, and what order to show them in, as well as branching (e.g., conditionally showing a screen prompt in response to a taxpayer input), looping (showing a screen prompt multiple times to obtain multiple sets of data, such as dependent information), error correction and data entry verification (checking that a data input matches the required data type).

Typical personal information screen prompts include: a name prompt; a marital status prompt; a social security number prompt; and an address prompt. Typical tax information screen prompts include: a number of dependents prompt; dependents' information prompt (e.g., name, age, social security number); a taxes withheld prompt; and an income and wages prompt. Typical financial information screen prompts include: credit card information prompt, a banking account number prompt, and a bank routing number prompt. A user responds to these prompts and other prompts by entering data with the alphanumeric keys 206. Those of skill in the art of tax return preparation appreciate that while the there are well defined data points that are to be gathered for tax return preparation (e.g., income, dependents, exemptions, etc.) the particular order in which the data is gathered, along with the language and design of the screen prompts for requesting this data is best decided by the application developer, and accordingly is not limited by the present invention.

In an embodiment, one or more of the tax keys 210 causes the interview logic 224 to branch directly to a sequence of one or more prompts for directly entering data associated with the tax key 210. For example, at any time after the start of data gathering interview, the taxpayer may press an "Exemptions" key to cause the display of the sequence of screen prompts for obtaining exemptions and dependent related information, which the taxpayer can then enter directly. The tax return preparation application 203 receives the directly entered data, and updates the appropriate calculations and data pertaining to tax return data, and returns the taxpayer to a current or next step of processing. The other tax keys 210 include: an "Income" key, which branches the interview logic 224 to a sequence of one or more prompts for directly entering the taxpayer's total wages, interest, and other forms of income; a "Deductions" key which branches the interview logic 224 to a sequence of screen prompts for directly entering the taxpayer's deductions; a "Taxes" key, branches the interview logic 224 to a sequence of screen prompts for directly entering the taxpayer's previously paid or withheld taxes.

The tax logic 222 is an example of one means for determining the taxpayer's tax return data. The tax logic 222 is the programming logic that makes numerical or logical calculations based upon the taxpayer's inputs. Tax logic 222 includes calculations and logic for totaling income and wages, determining number and amount of exemptions and deductions, determining total taxes paid or withheld, computing tax liability, including tax refund amount or tax due amount. For example, if a user has three dependents, then the tax logic 222 calculates the corresponding tax deduction amount; the calculation may be made by formula, by a table lookup, or by other logic. When packaged for transmission to the service provider 104, the tax return data can also include the input tax related data or portions thereof. This enables the service provider 104 to verify the tax calculations. One of ordinary skill in the art will appreciate a variety of screen prompts and a variety of numerical computations that can be controlled and performed by the interview logic 224 and tax logic 222 during the preparation of a tax return by the TPD 102. As an alternative embodiment, tax logic 222 can be provided within a tax return preparation module located on the service provider 104. The details of this embodiment are described later in relation to FIG. 3. The tax logic 222 may encoded in any type of programming code.

An alternative embodiment of the TPD 102 provides a more simplified architecture. This version of the TPD 102 includes the same components as described above, but eliminates the communications port 208 and modem 211, and any attendance software or firm needed for communications thereby. Instead, the TPD 102 includes a data port such as a four pin mini USB port, through which the contents of the memory 212 can be downloaded (e.g., tax return data). In manufacturing, the OS 216 and tax return preparation application 230 can loaded into memory via this port as well (or through an onboard interface).

Figure 3:
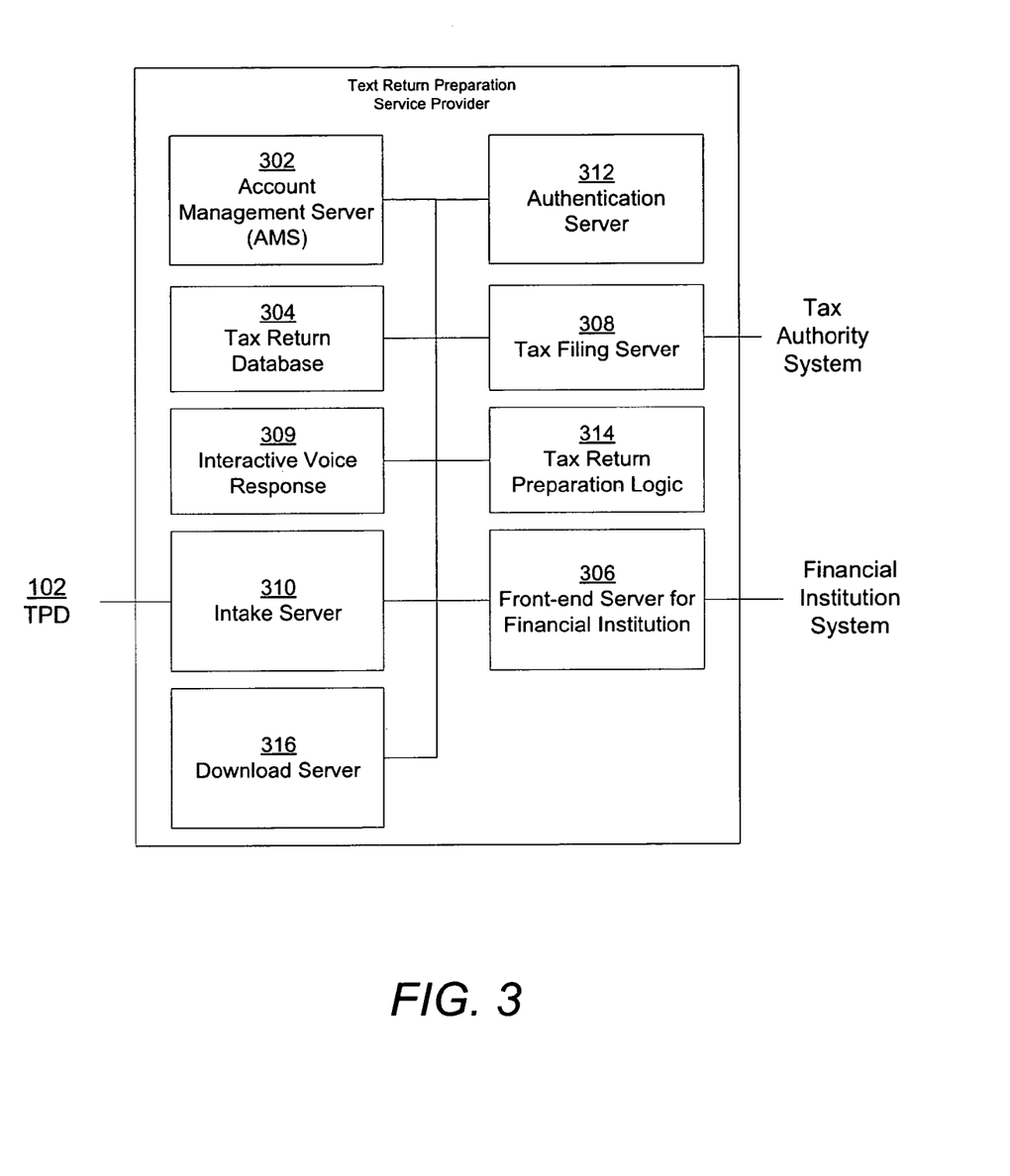
FIG. 3 is a block diagram of a tax return preparation service provider in accordance with an embodiment of the present invention.

FIG. 3 is a block diagram of a tax return preparation service provider (SP) 104 in accordance with an embodiment of the present invention. The service provider 104 provides a remote location for managing the preparation and filing of a taxpayer's electronic tax return with a tax authority 108, as well as interfacing with financial institutions 106 to receive tax refunds on behalf of taxpayers. In the illustrated embodiment, the SP 104 includes an account management server (AMS) 302, a tax return database 304, a front-end financial institution server 306, a tax filing server 308, an intake server 310, and an authentication server 312, tax return preparation logic 314, and download server 316, all communicatively coupled to one another by way of various networking interfaces. The various servers and database can be resident on one or several computers, as desired for system performance, security, and scalability. The service provider 104 may be an independent third party, unaffiliated with the tax authority, or in another embodiment, may be an agency or entity operated by or on behalf of the tax authority.

The authentication server 312 communicates with the TPD 102, and is an example of one means for authenticating the TPD 102 prior to initiating the preparation and filing of an electronic tax return for a taxpayer. The authentication server 312 authorizes the creation of a tax return account by the account management server 302. Authentication includes authentication of both the particular TPD that the taxpayer is using, as well as the taxpayer himself or herself. Each TPD 102 has a unique serial number assigned to it. The serial number is transmitted from the TPD 102 to the authentication server 312, which verifies the unique serial number, either by computation, by table lookup, or other programmatic means. If the TPD's serial number is invalid, then the authentication server 312 stops the tax return preparation process, and causes disconnection of the TPD 102 from the service provider 104. This security feature helps prevent attacks against the service provider 104. The authentication server 312 authenticates the taxpayer by verifying the taxpayer's credit card information before authorizing the creation of a tax return account. In an embodiment, the authentication server 312 authorizes the taxpayer's credit card for payment of tax return preparation services. In another embodiment, the purchase price of the TPD 102 includes a fee for the preparation and filing of the electronic tax return, in which case the authenticate server 312 need not process an authorization against the taxpayer's credit card (though the credit card can still be used for authenticating the identity of the taxpayer). The authentication server 312 is also adapted to provide an authentication token for the taxpayer's tax return (e.g., a digital signature) before the tax return is transmitted to the tax authority 108. Alternatively, the taxpayer may authorize a tax preparation and filing fee to be deducted from the taxpayer's financial account, or from an anticipated tax refund.

The account management server 302 communicates with the tax return database 304, and is one example of a means for enabling the taxpayer to access his or her return, and determine status of the tax return, and perform other account management operations (e.g., managing name, address, billing, banking, password, PIN, and similar personal information). The AMS 302 can include an administrative user interface for a system operator to review taxpayer accounts, determine status, and print returns for mailing back to the taxpayer. The AMS 302 also communicates with the TPD 102 to establish a tax return account for the taxpayer. In an embodiment, the taxpayer account is established in the database 304 using the taxpayer's credit card information, taxpayer's name, address, and social security number once the authentication server 312 has authenticated the taxpayer. In an embodiment, the AMS 302 requests authentication of a user's name, address, social security number, and credit card information before creating a new user account. After a tax return is completed, the AMS 302 requests the authentication server 312 to authenticate the tax return before a tax return is transmitted to the tax authority 108.

The tax return intake server 310 communicates with TPD 102, and is one example of a means for receiving the tax return data from the TPD 102. In one embodiment the tax return intake server 310 also has the capability to receive encrypted tax return data from the TPD 102 and decrypt the tax return data for storage in the tax return database 304. The encryption protocol used by the TPD 102 and the intake server 310 may be public key or private key based. The tax return intake server 310 also performs data validation to ensure that the tax return data is complete once received from the TPD 102, for example to ensure that the necessary data values for different parts of the tax return have been received and are of the correct data type. In one embodiment, service provider system includes tax return preparation logic 314, similar to the tax logic 222 described above in relation to FIG. 2. The tax return preparation logic 314 is the logic that makes local numerical calculations based upon the received tax return data, like totaling income, computing the amount of a refund, computing deductions, etc. In this embodiment, the tax return intake server 310 is adapted to receive the tax return data from the TPD 102, verify the tax return data, and provide the data to the tax return preparation logic 314 to perform tax related calculations based upon the tax return data. The completed tax return is then stored in the tax return database 304. One of ordinary skill in the art will appreciate a variety of numerical computations that can be controlled and performed by the tax return preparation logic during the preparation of a tax return by service provider system.

The tax return database 304 communicates with the intake server 310 and the tax return preparation logic, and is one example of a means to receive and store the tax returns. The tax return database 304 can also communicate with the tax filing server 308 to provide the tax returns to the tax filing server 308 for filing with the tax authority 108. In one embodiment the tax return database 304 can be implemented in any variety of database systems, such as a relational database, so long as it is capable of storing tax return data. The interactive voice response (IVR) system 309 communicates with the tax return database 304 to access status information for the taxpayers' tax returns. Taxpayers telephone the service provider 104, which calls are received by the IVR 309. The IVR 309 provides a menu of options for taxpayers to access the status of their tax return, including amount of tax refund, amount of tax due, expected date of refund, address for making tax payments, and the like. The IVR 309 receives via the telephone inputs (e.g., DTMFs or verbal inputs to a speech recognizer), identifying the taxpayer (e.g., SSN, PIN), and then accesses the tax return database 304 for the requested information. In an alternative embodiment, the TPD 102 is adapted to call service provider 104 and query the tax return database 304 for the status of the tax return, and to display the status information on its display 214. For this embodiment an additional tax key 210 (e.g., "Check Status") may be provided on the TPD 102.

The front-end financial institution server 306 is one example of a means for providing an interface to enable the tax authority 108 to directly deposit a tax refund into the taxpayer's account at the financial institution 106. In an embodiment, the front-end financial institution server 306 can authorize the tax authority (or a third party tax payment processor) to authorize a tax payment against the tax payer's credit card. In one embodiment for payment of federal taxes, the front-end financial institution server 306 provides an interface to the Internal Revenue Service's use of the U.S. Treasury's Electronic Federal Tax Payment System (EFTPS).

The tax filing server 308 communicates with the tax authority 108, and is one example of a means for electronically filing one or more of tax returns. The tax filing server 308 can file the tax returns either individually or in batches. The tax filing server 308 insures that any returns or batches of returns filed with the tax authority 108 comply with electronic filing system guidelines as determined by the particular tax authority 108. Where the tax filing server 308 is used for filing U.S. federal taxes, the tax filing server 308 complies with the requirements set forth by the Internal Revenue Service in the following IRS publications: 3112, 1345, 1345A, 1346, and 1438. Similarly, where the tax filing server is used for filing state taxes, its complies with the requirement set forth by the individual state tax authorities. In an embodiment, tax filing server 308 performs SSL-3 strong encryption, of at least 128 bits, using 3DES (triple-data encryption standard) algorithms before transmitting the tax return to the tax authority 108.

Figure 4:
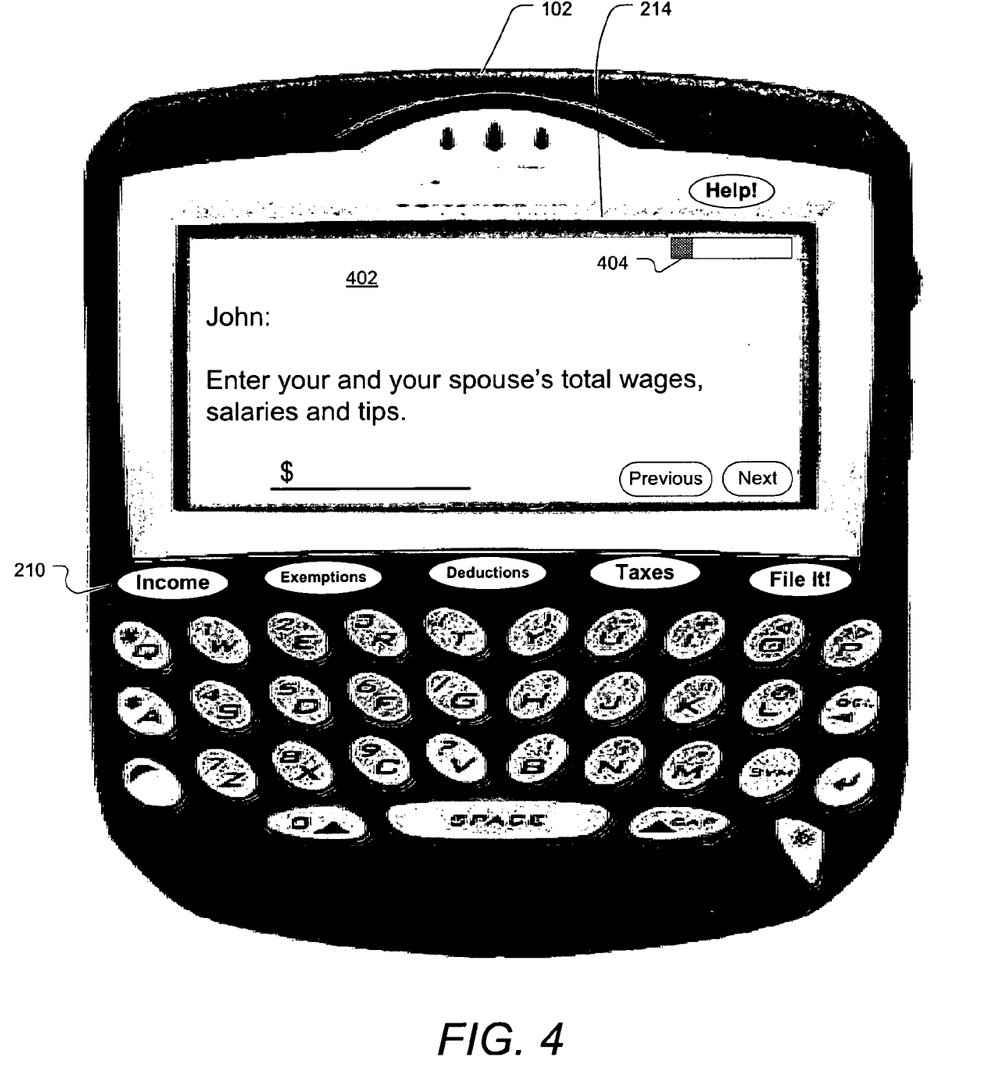
FIG. 4 is an illustration of a system for providing tax services with a portable, dedicated, disposable tax return preparation device in accordance with another embodiment of the present invention.

FIG. 4 is an illustration of a portable, dedicated, disposable tax return preparation device 102 in accordance with one embodiment of the present invention. Here, screen display 214 includes an example screen prompt 402, used to request the taxpayer to enter the total wages, salary and tips. A completion gauge 404 is optionally displayed, and provides a visual aid for the taxpayer to determine how much of the tax interview has been completed. "Next" and "Previous" buttons are provided to enable the taxpayer to move through the tax interview or correct previous data entries. One of skill in the art will now appreciate a variety of screen prompts or graphics that can be displayed on screen display 214 for efficient tax return preparation.

As seen in FIG. 4, tax keys 210 can include an "Income" key 210, an "Exemptions" key 210, a "Deductions" key 210, a "Taxes" key 210, a "File It!" key 210, and a "Help" key 210. Those of skill in the art will now appreciate that other preprogrammed tax keys 210 may be also be provided, and that their shape, size and location can be varied.

Figure 5A:
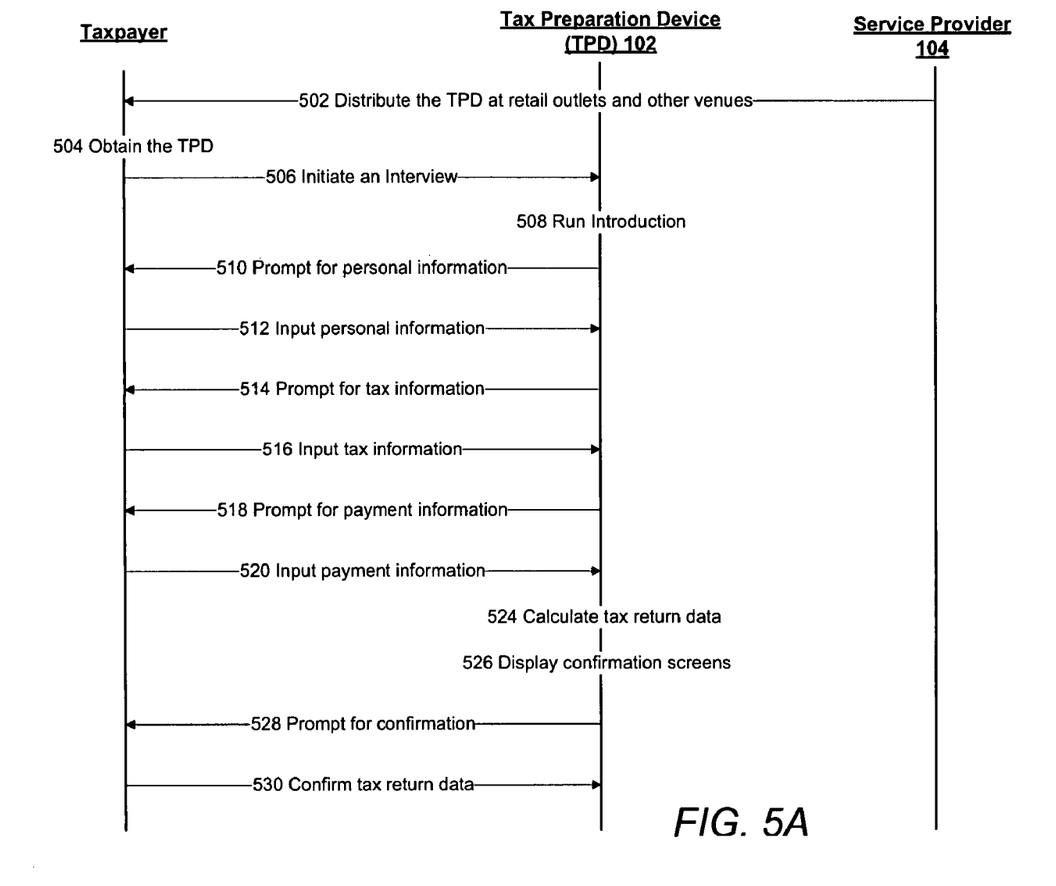
FIGS. 5A-5C are event traces for a system for providing tax services with a portable, dedicated, disposable tax return preparation device in accordance with an embodiment of the present invention.
Figure 5B:
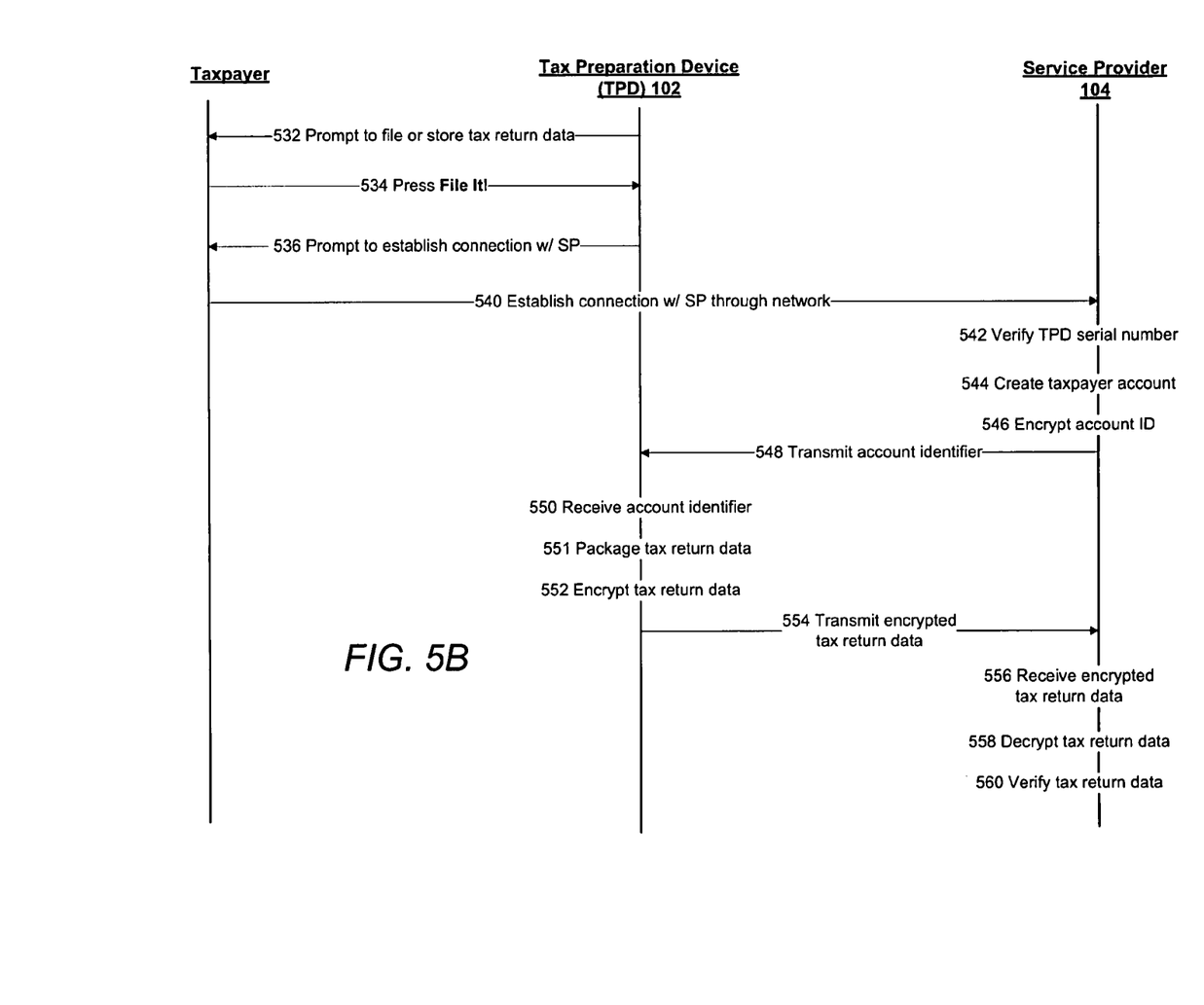
Figure 5C:
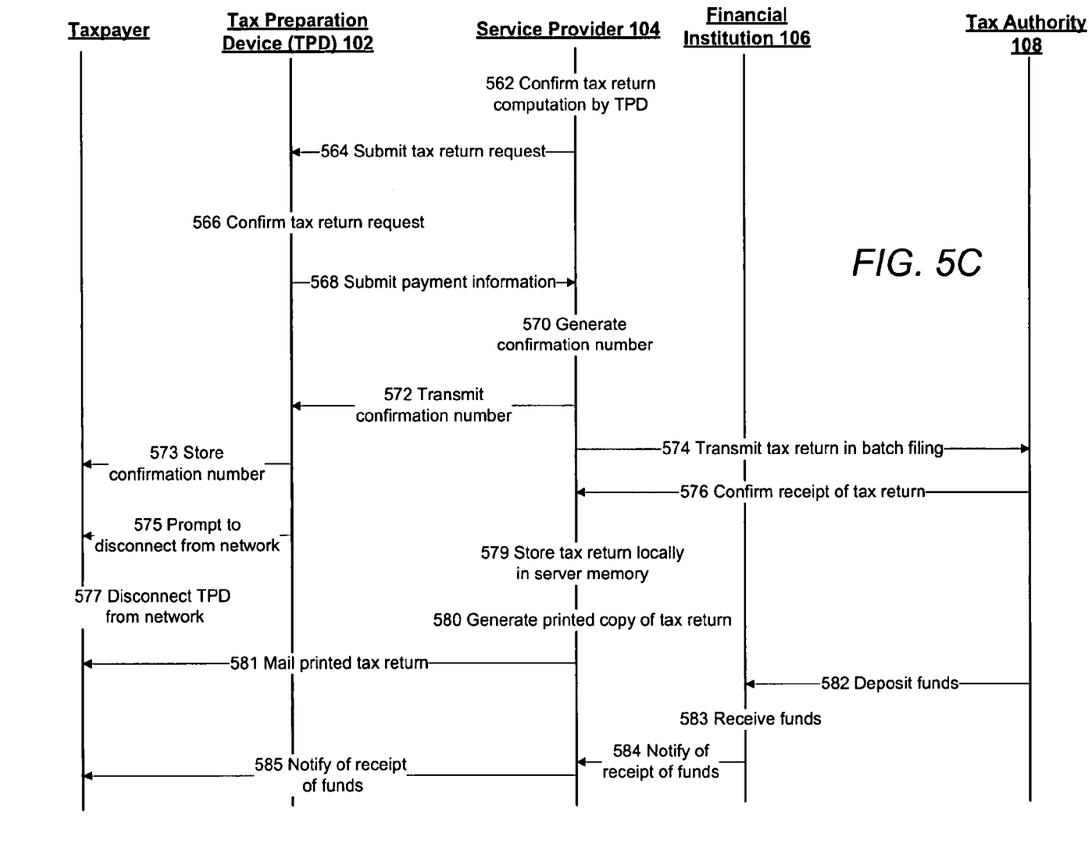

FIGS. 5A-5C are event traces describing aspects of a methodology for providing tax services with a portable, dedicated, disposable tax return preparation device in accordance with an embodiment of the present invention. Initially, the service provider 104 distributes 502 the TPD 102 or a plurality of TPDs 102 at various retail outlets or distribution centers. The service provider can also distribute TPD 102 at discount stores, warehouses, supermarkets, bookstores, consumer electronics stores. A user can also obtain 504 a TPD 102 by purchasing the TPD 102 at a store, or receiving the TPD 102 in the mail, or receiving the TPD 102 free as a gift, or ordering the TPD by phone. The TPD 102 can be provided to a user in the form of a disposable tax return preparation kit. In an embodiment, each tax return preparation kit includes the tax return preparation device 102, a brief user's guide for initiating a tax return preparation interview, and a telephone cable (or similar communications cable) to enable the user to quickly connect the device to a standard telephone network.

Referring to FIG. 5A, upon reviewing the taxpayer's guide, the taxpayer initiates 506 a tax return preparation interview with the TPD 102, for example by turning the device on, which automatically launches the tax return preparation application 230. The TPD 102 then runs 508 a short introduction to the tax return preparation interview process. The introduction can include a greeting, a reminder to collect the appropriate W-2 and 1099 forms for the taxpayer and/or the taxpayer's spouse, and overview of the tax filing process using the TPD 102. At this point, the TPD 102 prompts 510 the taxpayer to input their tax related data including their personal information, including name, address, social security number, etc., using one or more screen prompts, according to the interview logic 224. The taxpayer inputs 512 the personal information using the alphanumeric keys 206. The TPD 102 prompts 514 the taxpayer for other tax related data, including income, exemptions, taxes withheld, deductions, etc., using one or more screen prompts. The taxpayer inputs 516 the tax related data via the first plurality of alphanumeric keys 206. The TPD 102 prompts 518 the taxpayer for their financial information, including credit card number, expiration date, banking account number, routing number, etc. The taxpayer inputs 520 the financial information via the first plurality of alphanumeric keys 206. The particular order of the general steps outlined here for gathering the taxpayer information and tax related data may of course be altered; e.g., the taxpayer's financial information may be received prior to the tax related information.

In one embodiment, using the tax related data input by the taxpayer, the TPD 102 calculates 524 tax return data for the taxpayer and displays 526 the tax return data in one or more confirmation screens. The tax return data can include total taxable income, total taxes paid, total tax due (or refund owing). The TPD 102 then prompts 528 the taxpayer to confirm the tax return data (including any of the tax related data). The taxpayer can confirm 530 by pressing a key, button or other interface mechanism. At this point, the TPD 102 prompts 532 the taxpayer to either file the tax return or store the tax return in memory 212 for later retrieval. In one embodiment, the taxpayer decides to file the tax return and presses 534 the "File It" tax key 210. Upon receiving notification that the taxpayer wishes to file the tax return, the TPD prompts 536 the taxpayer to establish connection with the service provider 104. In response to the prompt 536, the taxpayer establishes 540 a connection with the service provider 104 by connecting the TPD 102 to a telephone network with the telephone cable provided in the tax return kit. The taxpayer can further respond to another prompt to indicate that the TPD 102 has been physically connected to the telephone network. The TPD 102 then establishes the communications connection, for example by dialing with the modem 211 a preassigned telephone number to connect with the intake server 210 in the service provider's system 104.

Once a communications connection has been established 540 between the TPD 102 and the service provider 104, the TPD 102 transmits its serial number to the service provider 104, which verifies 542 the serial number using the authentication server 312. Upon verification of the TPD, the service provider 104 creates 544 a taxpayer account using the AMS 302. The AMS 302 associates the account with an account identifier, such as the taxpayer's Social Security number, or taxpayer identification number; additional identifiers (e.g., random numbers, a hash of the SSN or taxpayer identification number) may be used as well. The account identifier (or a hash thereof to maintain confidentiality) is then transmitted 548 to the TPD 102, to allow the TPD 102 use the identifier in further transmissions. The TPD receives 550 the account identifier, packages the tax return data (including any tax related data), encrypts 552 the tax return data, and transmits 554 the encrypted tax return data back to the intake server 310. The encrypted tax return data is received 556 by the service provider 104, and decrypted 558 by authentication server 312 (which can also verify the account identifier/hash). The tax return data is verified 560 by the service provider 104 for completeness and data format. Once the tax return data is verified 560, the tax return computations performed by the TPD 102 are confirmed 562 by the service provider 104, for example using the tax return preparation logic 314.

Upon confirming 562 the tax return data, the SP 104 submits 564 a tax return request to the TPD 102. The taxpayer reviews the final tax return data, and via TPD 102 confirms 566 the tax return request and also optionally submits 568 payment information (if required; alternatively the service can be prepaid or free). If necessary, at this point, the service provider may authorize payment against the taxpayer's credit card, or alternatively queue an ACH or EFT transaction to debits funds from a taxpayer's banking account. If payment has been made (or set for payment), the service provider generates 570 a confirmation number and then transmits 572 the confirmation number to the TPD 102. The TPD stores 573 the confirmation number in memory (and may display a confirmation message to the taxpayer) and prompts 575 the taxpayer to disconnect the TPD 102 from the network. The taxpayer then disconnects 577 the TPD 102 from the network.

After transmission 572 of the confirmation number, the SP 104 then (asynchronously) transmits 574 the confirmed tax return to the tax authority 108 in a batch filing, in conformance with electronic tax filing guidelines set forth by tax authority, such as the various IRS publications indicated above. The tax authority 108 confirms 576 receipt of the tax return by responding to the service provider 104. At this point, the service provider 104 can store 579 the tax return locally in the tax return database 304, along with any associated authentication, security, or confirmation information provided by the tax authority 108. The SP 104 then (again, asynchronously) generates 580 a printed copy of the tax return, and mails 581 the printed tax return to the taxpayer, along with information and instructions for accessing the taxpayer's account via telephone or otherwise to obtain information on the status of the taxpayer tax return, and if appropriate, tax refund. Thus, taxpayer receives a copy of the filed tax return, without having to print one out themselves, for example on a locally connected printer. This is another feature that is advantageous to the user of the TPD 102 who may not otherwise have a personal computer and printer available. The tax authority is capable of depositing 578 funds directly into a taxpayer's financial institution 106 where there is a tax refund due to the taxpayer. The financial institution 106 is then capable of receiving 580 the funds and notifying 582 the service provider 104 of receipt of funds. The SP 104 can then notify the taxpayer of the received funds, for example by automatic generation of a telephone call to the taxpayer's telephone number, along with an automatically generated letter to the taxpayer confirming the receipt of the funds as well. In addition, using the previously provided confirmation number, password, or other indicia of authentication, the taxpayer can access information regarding the status of the tax return using a telephone to dial into the interactive voice response system 309.

The SP 104 can send a message of the amount of tax due to the TPD 102 in the case that a taxpayer owes more taxes. The TPD 102 provides instructions to mail the amount due to the tax authority 108 or can give instructions on how to electronically make the payment to the tax authority 108, e.g., through the use of a credit card based tax payment service. The SP 104 can provide the tax authority's correct address to which to mail a payment based on the taxpayer's state of residence or permanent address, using a lookup of such data from a data table, and transmitting the information to the TPD 102. Alternatively, the address information may be stored already in the TPD 102, and retrieved therefrom. The taxpayer then mails the payment to the tax authority 108. As an optional feature, a tax payment form can be included in the tax return preparation kit for the taxpayer to complete, only if necessary, including both the payment form and an envelope. The envelope can be preprinted in the name of the tax authority (e.g., Internal Revenue Service) with spaces for the city, P.O. Box, and zipcode so the taxpayer can fill it in, based on the instructions received from the service provider 104, and displayed on the TPD 102, or from additional printed materials in the kit.

Various additional operations can be included or substituted in the foregoing process. First, prior to, or as a part of the execution of the tax return preparation application 230 on the TPD 102, the user is prompted to connect the TPD 102 to the service provider 104, whereby the service provider 102 transmits a software update of the tax return preparation application 230. The update may include for example, updated tax information such as tax rates, schedules, limits, tax computations, updated screen prompts or questions, or any other updated information necessary for execution of the tax return preparation application.

Secondly, in an embodiment where the simplified embodiment of the TPD 102 is provided, the event traces of FIGS. 5A-5C are modified. In this type of embodiment, the taxpayer executes the tax return preparation as before and inputs his tax return related information, whereby the TPD 102 calculates the tax return data. In this embodiment, the tax return preparation application can make an initial calculation of the taxpayer's tax return, including either a tax refund due to the taxpayer or a tax payment due to the tax authority. This allows the taxpayer to know aforehand, with at least some degree of accuracy, the results of their tax return. This information is stored in the memory 212. Since this version of the TPD 102 does not include a communications port 208 and modem 211, the taxpayer mails (or otherwise physically delivers) the TPD 102 to the service provider. In this regard, the TPD 102 can be packaged with a prepaid mailer addressed to the service provider or to an agent thereof The TPD 102 can include screen prompts which prompt the taxpayer to mail or otherwise deliver, the TPD 102 to the service provider. Additionally or alternatively, the service provider can provide any number drop off stations where the taxpayer may deposit the TPD 102 (e.g., in a provided deposit envelope or package) for pickup and processing by the service provider.

In any of these cases, the service provider 104 receives the TPD 102 from the taxpayer. The service provider 104 couples the TPD 102 to the download server 316 via input device adapted to physically couple with TPD 102 (e.g., through a standard data port such a mini-USB port, or a proprietary data port) and electronically couple with the memory 212 and download therefrom the stored tax return data. The downloaded information is then passed to the other components of the tax return preparation and filing system, for creation of an account of the taxpayer and preparation and filing of an electronic tax return for the taxpayer. As before, a printed copy of the taxpayer's tax return is generated, along with additional account information. The printed copy is then mailed to the taxpayer. Where a tax payment is due from the taxpayer, this information is included on a preprinted tax payment form that is included with the taxpayer's return. The tax payment form is customized for the taxpayer, and includes the taxpayer's name, address, social security number (and spouse's if appropriate), and amount of tax due, along with an envelope preprinted with the address for the geographically appropriate service center for the tax authority. The taxpayer then provides a payment (e.g., check) and mails the preprinted form, payment in the provided preprinted envelope.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the casino management arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A tax return preparation kit, comprising:
    a dedicated disposable tax return preparation device comprising a plurality of alphanumeric keys and a read-only memory (ROM) storing a restricted operating system (OS) and a tax preparation application, wherein the restricted OS is restricted to supporting execution of the tax preparation application and communication with a remote tax return preparation system, the tax preparation application configured to:
        receive taxpayer input of tax related data comprising financial and tax information of a taxpayer entered by the taxpayer using the plurality of alphanumeric keys;
        determine, in response to receiving the tax related data and based on the received tax related data, tax return data including at least one selected from a group consisting of a tax refund due to the taxpayer and a tax payment due by the taxpayer; and
        prompt, in response to receiving notification from the taxpayer to file the tax return data, the taxpayer to connect a communications cable to a telecommunications system; and
    the communications cable for communicatively coupling the dedicated disposable tax return preparation device to the telecommunications system, the dedicated disposable tax return preparation device adapted to transmit via the communications cable the tax return data to the remote tax return preparation system coupled to the telecommunications system and adapted to:
        receive the tax return data determined by the dedicated disposable tax return preparation device,
        prepare an electronic tax record based on the tax return data, and
        electronically file the electronic tax return with a tax authority.

2. The kit of claim 1, wherein the dedicated disposable tax return preparation device further comprises:
    a processor for executing the tax return preparation application to receive the taxpayer input of the tax related data and determine the tax return data based on the tax related data;
    a communications port adapted to receive the communications cable;
    a display for displaying screen prompts provided by the tax return preparation application that request tax related data; and
    a plurality of preprogrammed function keys for activating predetermined functions of the tax return preparation application.

3. The kit of claim 2, wherein the plurality of preprogrammed function keys comprise:
    a first key adapted to cause the tax return preparation application to display at least one screen prompt prompting the taxpayer to provide exemptions and dependent related information;
    a second key adapted to cause the tax return preparation application to display at least one screen prompt prompting the taxpayer to provide the taxpayer's total wages, interest, and other forms of income;
    a third key adapted to cause the tax return preparation application to display at least one screen prompt prompting the taxpayer to provide the taxpayer's deductions; and
    a fourth key adapted to cause the tax return preparation application to display at least one screen prompt prompting the taxpayer to provide the taxpayer's previously paid or withheld taxes.

4. The kit of claim 2, wherein the tax return preparation application comprises:
    tax return preparation interview logic comprising a plurality of screen prompts to prompt the input of the tax related data with the plurality of alphanumeric keys, and programming logic for selectively sequencing the plurality of screen prompts.

5. The kit of claim 4, wherein the tax return preparation application further comprises:
    tax return preparation logic, that executes tax calculations based upon the taxpayer input in response to the plurality of screen prompts for preparation of the tax return data.

6. The kit of claim 1, further comprising a random access memory for storing the tax return data.

7. The kit of claim 1, wherein the remote tax return preparation system is hosted by a tax return preparation service provider.

8. The kit of claim 1, wherein the remote tax return preparation system is adapted to authorize creation of a tax return account by verifying a portion of the taxpayer-provided input.

9. The kit of claim 1, wherein the remote tax return preparation system is further adapted to:
    receive encrypted tax return data from the tax return preparation device; and
    decrypt the encrypted tax return data.

10. The kit of claim 1, wherein the remote tax return preparation system is adapted to provide to the tax authority taxpayer account information to allow the tax authority to directly deposit the tax refund into a financial institution account associated with the taxpayer.

11. The kit of claim 1, wherein the remote tax return preparation system is further adapted to generate a printed copy of the tax return, and authorize delivery of the printed tax return to the taxpayer via a postal service.

12. The kit of claim 1, wherein the dedicated disposable tax return preparation device is adapted to encrypt the tax return data prior to transmitting the tax return data to the remote tax return preparation system.

13. A tax return preparation kit, comprising:
    a dedicated disposable tax return preparation device comprising a plurality of alphanumeric keys and a read-only memory (ROM) storing a restricted operating system (OS) and a tax preparation application, wherein the restricted OS is restricted to supporting execution of the tax preparation application and communication with a remote tax return preparation system, the tax preparation application configured to receive taxpayer input of tax related data comprising financial and tax information of the taxpayer entered by the taxpayer using the plurality of alphanumeric keys, without determining a tax refund due to the taxpayer and a tax payment due from the taxpayer; and a communications cable for communicatively coupling the dedicated disposable tax return preparation device to a telecommunications system, the dedicated disposable tax return preparation device adapted to transmit the tax related data via the communications cable to the remote tax return preparation system also coupled to the telecommunications system, the remote tax return preparation system adapted to receive the tax related data, prepare an electronic tax return based on the tax related data, including at least one selected from a group consisting of the tax refund due to the taxpayer and the a tax payment due from the tax payer, and electronically file the electronic tax return with a tax authority.

14. The kit of claim 13, wherein the dedicated disposable tax return preparation device further comprises:
a processor for executing the tax return preparation application to receive the taxpayer input of the tax related data;
a communications port adapted to receive the communications cable;
a display for displaying screen prompts of the tax return preparation application that request tax related data; and
a plurality of preprogrammed function keys for activating predetermined functions of the tax return preparation application.

15. The kit of claim 13, wherein the plurality of preprogrammed function keys comprise:
a first key adapted to cause the tax return preparation application to display at least one screen prompt prompting the taxpayer to provide exemptions and dependent related information;
a second key adapted to cause the tax return preparation application to display at least one screen prompt prompting the taxpayer to provide the taxpayer's total wages, interest, and other forms of income;
a third key adapted to cause the tax return preparation application to display at least one screen prompt prompting the taxpayer to provide the taxpayer's deductions; and
a fourth key adapted to cause the tax return preparation application to display at least one screen prompt prompting the taxpayer to provide the taxpayer's previously paid or withheld taxes.

16. The kit of claim 13, wherein the tax return preparation application comprises:
tax return preparation interview logic comprising a plurality of screen prompts to prompt the input of the tax related data with the alphanumeric keys, and programming logic for selectively sequencing the plurality of screen prompts.

17. The kit of claim 13, wherein the remote tax return preparation system comprises:
tax return preparation logic, that executes tax calculations based upon the received tax related data from the dedicated disposable tax return preparation device to prepare the electronic tax return including the at least one selected from a group consisting of the tax refund due to the taxpayer or the tax payment due from the tax payer.

18. The kit of claim 13, wherein the remote tax return preparation system is adapted to authorize creation of a tax return account by verifying a portion of the tax related data.

19. The kit of claim 13, wherein the remote tax return preparation system is further adapted to generate a printed copy of the tax return, and authorize delivery of the printed tax return to the taxpayer via a postal service.

20. The kit of claim 14, further comprising a random access memory for storing the tax return data.

21. A tax return preparation system, comprising:
a dedicated disposable tax return preparation device, comprising:
a read-only memory (ROM);
a processor;
a self-contained power source for powering the processor;
an embedded operating system stored in the ROM and executable by the processor, wherein the embedded operating system is restricted to supporting execution of a tax preparation application and communication with a remote tax return preparation system;
the tax return preparation application, stored in the ROM and executable by the processor;
a communications interface adapted to communicatively couple to a telecommunications system;
a plurality of alphanumeric keys for receiving taxpayer input of tax related data comprising financial and tax information of the taxpayer entered by a taxpayer using the plurality of alphanumeric keys, for use by the tax return preparation application in determining tax return data including at least one selected from a group consisting of a tax refund due to the taxpayer and a tax payment due from the taxpayer;
a plurality of preprogrammed function keys, each function key adapted to cause the tax return preparation application to display at least one screen prompt; and
the remote tax return preparation system coupled to the telecommunications system, the remote tax return preparation system is adapted to receive the tax return data from the dedicated disposable tax return preparation device, and in response to receiving the tax return data, prepare an electronic tax return based on the tax return data, and electronically file the electronic tax return with a tax authority.

22. The system of claim 21, wherein the tax return preparation application comprises:
tax return preparation interview logic comprising a plurality of screen prompts that prompt the taxpayer through an interview session to input the tax related data using the plurality of alphanumeric keys, the tax related data including personal, financial, and tax information.

23. The system of claim 21, further comprising a random access memory for storing the tax return data.

24. The system of claim 21, wherein the remote tax return preparation system is adapted to prepare the electronic tax return based on the tax return data by at least:
receiving an encrypted tax return from the tax return preparation device;
decrypting the encrypted tax return to obtain the tax return data; and
confirming the tax return data determined by the tax return preparation device.

25. The system of claim 21, wherein the remote tax return preparation system is adapted to authorize creation of a tax return account by verifying a portion of the taxpayer-provided input.

26. The system of claim 22, wherein the tax return preparation application further comprises:
programming logic for selectively sequencing the plurality of screen prompts.

27. The system of claim 26, wherein the tax return preparation application further comprises:
   tax return preparation logic, that executes tax calculations based upon the taxpayer input in response to the screen prompts for determining the tax return data.

28. The system of claim 21, wherein the plurality of preprogrammed function keys comprise:
   a first key adapted to cause the tax return preparation application to display at least one screen prompt prompting the taxpayer to provide exemptions and dependent related information;
   a second key adapted to cause the tax return preparation application to display at least one screen prompt prompting the taxpayer to provide the taxpayer's total wages, interest, and other forms of income;
   a third key adapted to cause the tax return preparation application to display at least one screen prompt prompting the taxpayer to provide the taxpayer's deductions; and
   a fourth key adapted to cause the tax return preparation application to display at least one screen prompt prompting the taxpayer to provide the taxpayer's previously paid or withheld taxes.

29. The system of claim 21, wherein the remote tax return preparation system further comprises:
   an intake server adapted to receive the tax return data from the dedicated disposable tax return preparation device via the telecommunication system; and
   a tax filing server adapted to prepare the electronic tax return based on the tax return data, and electronically file the electronic tax return with the tax authority.

30. The system of claim 29, wherein the remote tax return preparation system further comprises:
   an authentication server adapted to communicate with the disposable tax return preparation device, for authenticating the dedicated disposable tax return preparation device prior to the tax filing server preparing and filing of the electronic tax return.

31. The system of claim 29, wherein the remote tax return preparation system further comprises:
   a tax return database, adapted to communicate with the intake server, for receiving and storing the electronic tax returns.

32. The system of claim 31, wherein the remote tax return preparation system further comprises:
   an account management server adapted to communicate with the tax return database, for enabling the taxpayer to access a stored electronic tax return provided by the taxpayer via one of the dedicated disposable tax return preparation devices.

33. The system of claim 29, wherein the remote tax return preparation system further comprises:
   a front-end financial institution server, for providing an interface to enable the tax authority to directly deposit the tax refund for the electronic tax return into an account of the taxpayer at a financial institution.

34. A method for preparing a tax return with a dedicated disposable tax return preparation device, the method comprising:
   storing a restricted operating system (OS) and a tax preparation application in a read-only memory (ROM) of the dedicated disposable tax return preparation device, wherein the restricted OS is restricted to supporting the execution of the tax preparation application stored and communication with a remote tax return preparation system;
   with the tax preparation application in the dedicated disposable tax return preparation device:
      prompting a taxpayer through an interview session to input tax related data;
      receiving the tax related data comprising financial and tax information of the taxpayer entered by the taxpayer using a plurality of alphanumeric keys contained on the disposable tax return preparation device;
      calculating tax return data, in response to receiving the tax related data and based on the received tax related data, the tax return data including at least one of a group consisting of a tax refund due to the taxpayer and a tax payment due from the taxpayer;
      prompting the taxpayer to connect the dedicated disposable tax return preparation device to a telecommunications system using a communications cable;
      transmitting the tax return data, through the communications cable to the remote tax return preparation system;
   with the remote tax return preparation system:
      receiving the tax return data from the dedicated disposable tax return preparation device;
      preparing an electronic tax return based on the tax return data; and
      electronically filing the electronic tax return with a tax authority.

35. A method for preparing a tax return with a dedicated disposable tax return preparation device, the method comprising:
   storing a restricted operating system (OS) and a tax preparation application in a read-only memory (ROM) of the dedicated disposable tax return preparation device, wherein the restricted OS is restricted to supporting the execution of the tax preparation application and communication with a remote tax return preparation system;
   with the tax preparation application in the dedicated disposable tax return preparation device:
      prompting a taxpayer through an interview session to input tax related data
      receiving the tax related data comprising financial and tax information of the taxpayer entered by the taxpayer using a plurality of alphanumeric keys contained on the disposable tax return preparation device, without determining a tax refund due to the taxpayer and a tax payment due from the taxpayer;
      prompting the taxpayer to connect the dedicated disposable tax return preparation device to a telecommunications system using a communications cable;
      transmitting the tax related data, through the communications cable to the remote tax return preparation system;
   with the remote tax return preparation system:
      receiving the tax related data from the dedicated disposable tax return preparation device;
      determining based on the tax related data at least one selected from a group consisting of the tax refund due to the taxpayer or the tax payment due from the tax payer;
      preparing an electronic tax return including the at least one selected from a group consisting of the tax refund due to the taxpayer and the tax payment due from the taxpayer; and
      electronically filing the electronic tax return with a tax authority.

36. A method for preparing a tax return with a dedicated disposable tax return preparation device, the method comprising:
 storing a restricted operating system (OS) and a tax preparation application in a read-only memory (ROM) of the dedicated disposable tax return preparation device, wherein the restricted OS is restricted to supporting the execution of the tax preparation application and communication with a remote tax return preparation system;
 with the tax preparation application in the dedicated disposable tax return preparation device:
  prompting a taxpayer through an interview session to input tax related data;
  receiving the tax related data comprising financial and tax information of the taxpayer entered by the taxpayer using a plurality of alphanumeric keys contained on the disposable tax return preparation device;
  preparing a tax return data, in response to receiving the tax related data and based on the received tax related data, the tax return data including at least one of a group consisting of a tax refund due to the taxpayer and a tax payment due from the taxpayer;
  storing the tax return data in a memory in the dedicated disposable tax return preparation device; and
 with the remote tax return preparation system:
  receiving the dedicated disposable tax return preparation device;
  downloading the tax return data from the memory of the dedicated disposable tax return preparation device;
  preparing an electronic tax return based on the tax return data; and
  electronically filing the electronic tax return with a tax authority.

37. The method of claim 36, wherein receiving the dedicated disposable tax return preparation device comprises:
 receiving the dedicated disposable tax return preparation device via a mail carrier.

38. The method of claim 36, wherein receiving the dedicated disposable tax return preparation device comprises:
 receiving the dedicated disposable tax return preparation device from a deposit station, wherein the taxpayer has deposited the dedicated disposable tax return preparation device at the deposit station.

39. The method of claim 36, further comprising with the remote tax return preparation system:
 printing a completed copy of the taxpayer's tax return;
 mailing the completed copy of the tax return to the taxpayer.

40. The method of claim 39, further comprising with the remote tax return preparation system:
 printing a prefilled tax payment form for the taxpayer, including at least taxpayer identification information and the tax payment due from the taxpayer; and
 mailing the prefilled tax payment form to the taxpayer.

41. The method of claim 36, wherein preparing the electronic tax return comprises:
 calculating the tax refund due to the taxpayer or the tax payment due from the taxpayer.

42. A method for preparing tax returns for a plurality of tax payers, the method comprising:
 distributing a plurality of dedicated disposable tax return preparation devices to taxpayers, wherein each dedicated disposable tax return preparation device comprises a plurality of alphanumeric keys and a read-only memory (ROM) storing a restricted operating system (OS) and a tax preparation application, wherein the restricted OS is restricted to supporting execution of the tax preparation application and communication with a remote tax return preparation system, wherein the tax preparation application is configured to:
  receive tax related data entered by one of the plurality of taxpayers using the plurality of alphanumeric keys,
  determine, in response to receiving the tax related data and based on the received tax related data, tax return data for the taxpayer, and store the tax return data in a memory of a corresponding dedicated disposable tax return preparation device;
 at the remote tax return preparation system:
  communicatively coupling the remote tax return preparation system with the plurality of dedicated disposable tax return preparation devices over a telecommunication system, after the taxpayers have input their tax related data;
  receiving via the telecommunications system, the tax return data from the plurality of dedicated disposable tax return preparation devices;
  determining, for each taxpayer, based on the downloaded tax return data, at least one selected from a group consisting of a tax refund due to the taxpayer and a tax payment due from the tax payer;
  preparing, for each taxpayer, an electronic tax return including the at least one selected from a group consisting of the tax refund due to the taxpayer and the tax payment due from the taxpayer; and
  electronically filing, for each taxpayer, the electronic tax return of the taxpayer with a tax authority.

43. The method of claim 42, further comprising with the remote tax return preparation system:
 printing a completed copy of each taxpayer's tax return;
 mailing the completed copies of the tax returns to the respective taxpayers.

44. The method of claim 42, further comprising with the remote tax return preparation system:
 printing a prefilled tax payment form for at least some of the taxpayers, including for each tax payment form at least taxpayer identification information and the tax payment due from the respective taxpayer; and
 mailing the prefilled tax payment forms to the respective taxpayers.

45. The method of claim 42, wherein preparing, for each taxpayer, the electronic tax return comprises:
 calculating the tax refund due to the taxpayer or the tax payment due from the taxpayer.

46. A method for preparing tax returns for a plurality of tax payers, the method comprising:
 distributing a plurality of dedicated disposable tax return preparation devices to taxpayers, wherein each dedicated disposable tax return preparation device comprises a plurality of alphanumeric keys and a read-only memory (ROM) storing a restricted operating system (OS) and a tax preparation application, wherein the restricted OS is restricted to supporting execution of the tax preparation application and communication with a remote tax return preparation system, wherein the tax preparation application is configured to:
  receive tax related data entered by one of the plurality of taxpayers using the plurality of alphanumeric keys,
  determine, in response to receiving the tax related data and based on the received tax related data, tax return data for the taxpayer, and
  store the tax return data in a memory of a corresponding dedicated disposable tax return preparation device;

at the remote tax return preparation system:

receiving the plurality of dedicated disposable tax return preparation devices from taxpayers, after the taxpayers have input their tax related data;

downloading the tax return data from the plurality of dedicated disposable tax return preparation devices;

determining, for each taxpayer, based on the downloaded tax return data, at least one selected from a group consisting of a tax refund due to the taxpayer and a tax payment due from the tax payer;

preparing, for each taxpayer, an electronic tax return including the at least one selected from a group consisting of the tax refund due to the taxpayer and the tax payment due from the taxpayer; and electronically filing, for each taxpayer, the electronic tax return of the taxpayer with a tax authority.

* * * * *